United States Patent [19]
Antonenko et al.

[11] Patent Number: 5,866,342
[45] Date of Patent: Feb. 2, 1999

[54] SYSTEMS AND METHODS FOR THE SYNTHESIS OF ORGANIC COMPOUNDS

[75] Inventors: Valery V. Antonenko, Cupertino; Nicolay Kulikov, Santa Cruz, both of Calif.

[73] Assignee: Glaxo Group Limited, Greenford, United Kingdom

[21] Appl. No.: 722,657

[22] Filed: Sep. 27, 1996

[51] Int. Cl.[6] .............................. G01N 33/53; B01J 8/18
[52] U.S. Cl. ........................ 435/7.1; 436/501; 436/518; 530/333; 530/334; 422/99; 422/129; 422/131; 422/135; 422/138; 422/142; 422/146
[58] Field of Search ............................... 435/7.1; 436/50, 436/518; 530/333, 334; 422/99, 129, 131, 135, 137, 138, 141, 142, 145, 146

[56] References Cited

U.S. PATENT DOCUMENTS

| | | |
|---|---|---|
| 4,493,815 | 1/1985 | Fernwood et al. . |
| 4,526,690 | 7/1985 | Kiovsky et al. . |
| 4,598,049 | 7/1986 | Zelinka et al. ........................... 435/287 |
| 5,108,704 | 4/1992 | Bowers et al. . |
| 5,219,528 | 6/1993 | Clark . |
| 5,288,464 | 2/1994 | Nokihara . |
| 5,324,483 | 6/1994 | Cody et al. ............................. 422/131 |
| 5,503,805 | 4/1996 | Sugarman et al. . |
| 5,516,491 | 5/1996 | Kath et al. . |
| 5,620,894 | 4/1997 | Barger et al. . |
| 5,622,699 | 4/1997 | Ruoslahti et al. . |
| 5,665,975 | 9/1997 | Kedar . |

FOREIGN PATENT DOCUMENTS

| | | | |
|---|---|---|---|
| WO 91/07504 | 5/1991 | WIPO | ............................ C12Q 1/68 |
| WO 94/14972 | 7/1994 | WIPO | ............................ C12P 19/34 |
| WO 96/30761 | 10/1996 | WIPO | ............................ G01N 33/53 |
| WO 96/33010 | 10/1996 | WIPO | ................................ B01J 8/06 |
| WO 97/09353 | 3/1997 | WIPO | ................................ C08F 2/00 |
| WO 97/10896 | 3/1997 | WIPO | .............................. B01J 19/00 |

OTHER PUBLICATIONS

De Witt et al. "Automated synthesis and combinatorial chemistry" Current Opinion in Biotechnology, vol. 6, pp. 640–645, 1995.

Lashkari, et al., "An Automated Multiplex Oligonucleotide Synthesizer: Development of High–Throughput, Low Cost DNA Synthesis" Proc. Nat. Acad. Sci. USA, vol. 92, pp. 7912–7915, Aug. 1995, Applied Biological Sciences.

Multiblock—Instrument for Multiple and Combinatorial Synthesis—Brief Description and User's Manual, 5 pgs.

Meyers, et al., "Multiple Simultaneous Synthesis of Phenolic Libraries" ESCOM Science Publishers B.V., Leiden, The Netherlands, Copyright 1995, 16 pgs.

Product Brochure for a reaction block for "Combinatorial Chemistry" by *SyRo*, 1 pg.

Product Brochure, "Alchemy 2000 Automated Reactor System" Sagian Incorporated, 3 pgs.

Primary Examiner—Lora M. Green
Attorney, Agent, or Firm—Lauren L. Stevens; Darin J. Gibby

[57] ABSTRACT

The invention provides systems and methods for synthesizing various compounds on solid support. According to one exemplary method, a synthesizer is provided having at least one reaction vessel block with a plurality of reaction vessels therein. At least one solid support is introduced into a least some of the reaction vessels, and a reagent is introduced into the reaction vessels having the solid supports. The reaction vessel block is then vibrated while heat is supplied to the reaction vessel block to heat the reaction vessels. Optionally, the synthesized compounds may be cleaved from the solid supports following synthesis while they remain within the reaction vessels.

13 Claims, 9 Drawing Sheets

SYSTEMS AND METHODS FOR THE SYNTHESIS OF ORGANIC COMPOUNDS

BACKGROUND OF THE INVENTION

The invention relates generally to the field of chemical synthesizers. More particularly, the invention provides systems and methods for synthesizing various diverse chemical products on solid supports such as beads.

Diverse chemical products find a wide variety of uses, such as in drug discovery, genetic studies and the like. Exemplary diverse chemical products that are useful in scientific studies include peptides, oligonucleotides, and other related materials.

The synthesis of diverse chemical products typically proceeds by synthesizing diverse collections of molecules on a plurality of solid supports, such as beads. To do so, a variety of synthesizers and techniques have been proposed, such as, for example, those described in copending U.S. application Ser. No. 08/146,886, filed Nov. 2, 1993(Attorney Docket No. 16528-000730), now U.S. Pat. No. 5,639,603 the disclosure of which is herein incorporated by reference.

When synthesizing, the various reagents are typically mixed with the solid supports. Such mixing can be especially challenging, particularly since it is desirable to synthesize the compounds to the entire surface area of the supports. Synthesizing can also be challenging since it is often desirable to have the reactions occur at various temperatures which are precisely controlled and monitored. For example, it may be desirable to synthesize the same compound on various solid supports at different temperatures so that it may be determined at which temperature synthesis is most effective.

Following synthesis, it is often desirable to biologically screen the compounds synthesized on the beads, e.g., as a tool in drug discovery. To do so, the various compounds are often removed from the beads and subjected to various screening processes. A variety of automated high throughput screening devices have recently been proposed to screen the compounds. Such screening devices usually employ commercially available handling plates, such as standard 48- or 96-well plates, to handle the various compounds during the screening process.

Hence, it would be desirable to provide a high throughput chemical synthesizer having exemplary mixing capabilities so that the solid supports and reagents may be efficiently mixed during synthesis. It would further be desirable if such a synthesizer allowed various reactions to take place at different temperatures which could be closely monitored and controlled. It would further be desirable if such a synthesizer allowed for the removal of the synthesized compounds for subsequent screening, particularly with commercially compatible screening and handling equipment.

SUMMARY OF THE INVENTION

The invention provides systems and methods for synthesizing compounds on solid supports. One exemplary system comprises at least one reaction vessel block having a plurality of reaction vessels formed therein. A vibrator is provided to vibrate the reaction vessel block. The system further includes at least one heater that is associated with the reaction vessel block to supply heat to the reaction vessels.

The heater preferably comprises at least one heating element which is disposed within the reaction vessel block. The heating element is positioned to develop a temperature gradient within the block such that each reaction vessel may, if desired, be heated to a different temperature. Alternatively, the heating element can be operated to develop a generally constant temperature with the block. In one aspect, the reaction vessel block is constructed of aluminum to facilitate heat transfer.

In one aspect, the system further includes a heat exchanger adjacent the reaction vessel block. In this manner, heat from the reaction vessel may be removed by the heat exchanger. At least one thermocouple will preferably be disposed within the reaction vessel so that the temperature within the reaction vessel may be monitored. The heat exchanger is further advantageous in that it may be employed to facilitate the development of a temperature gradient within the block when a coolant is flowed through the heat exchanger. The temperature of the coolant will tend to increase as it travels through the heat exchanger, thus removing less heat.

In another aspect of the system, the reaction vessel block is provided with a plurality of apertures, with the reaction vessels being included within the apertures. Preferably, the reaction vessels are lined with polytetrafluoroethylene, sold under the tradename of Teflon.

In another aspect of the system, a base is provided and at least one resilient member is positioned between the base and the reaction vessel block. In this manner, the reaction vessel block may be vibrated independent of the base. In a preferable aspect, the resilient member comprises a spring so that the reaction vessel block may rest or "float" on the spring above the base. Preferably, the vibrator will also rest upon the spring so that, when actuated, the reaction vessel block will be vibrated in a unique manner to provide efficient mixing of the solid supports during synthesis.

The system preferably further includes at least one reagent source that is in fluid communication with at least one of the reaction vessels. The reaction vessels will preferably each include a bottom end and a top end, with a valve being positioned near the bottom end. In this manner, the valves may be employed to control the amount of reagent that is delivered to the reaction vessels through the bottom ends.

In still yet another aspect, the system further includes a collection plate having a plurality of wells. Through lengths of tubing which are operably connected to each reaction vessel, fluids from the reaction vessels may be delivered to the wells of the collection plate. The collection plate will preferably be configured to be compatible with commercially available screening equipment so that the collected fluids may be efficiently analyzed. For example, the collection plate may comprise a standard 48 or 96 well plate. The system preferably also includes a source of inert gas that is communication with each reaction vessel so that fluids may be displaced from the reaction vessels when introducing the inert gas. A source of washing solution will preferably also be in communication with each reaction vessel so that the solid supports may be appropriately washed.

The invention further provides an exemplary method for synthesizing compounds. According to the method, a least one reaction vessel block is provided having a plurality of reaction vessels therein. At least one solid support is introduced into at least some of the reaction vessels. A reagent is then introduced into the reaction vessels having the solid supports. The reaction vessel block is then vibrated while heat is supplied to the reaction vessel block to heat the reaction vessels.

The reaction vessel block is preferably vibrated by placing the block on a resilient member and vibrating the reaction vessel block with a vibrator (which preferably also rests upon the resilient member). In one step of the method, each reaction vessel may receive the same reagent. Alternatively, different reagents may be placed into each of the reaction vessels. In another aspect, each reaction vessel may be heated to the same temperature. Alternatively, heat may be supplied to a variety of locations within the reaction vessel block to develop a temperature gradient within the block and to heat the reaction vessels to different temperatures relative to each other. In yet another aspect, heat will preferably be removed from the reaction vessel block to cool the reaction vessels. Such heat removal may be accomplished by positioning a heat exchanger adjacent the reaction vessel block and flowing a coolant through the heat exchanger. The heat exchanger, in one aspect, also facilitates the development of the temperature gradient within the block by allowing the coolant to increase in temperature as it flows through the heat exchanger.

In another aspect of the method, the flow of the reagent through the reaction vessels is measured to determine if a sufficient amount of reagent was delivered to each reaction vessel. In another step, the method also includes the step of transferring fluids from the reaction vessels to a collection plate having a plurality of wells. The fluids removed from the reaction vessels will preferably comprise various compounds that have been removed or cleaved from the solid supports. In this manner, assays may be performed on the fluids while within the wells of the collection plate. To remove the various compounds from the solid supports, a cleaving solution will preferably be introduced into the reaction vessels.

DETAILED DESCRIPTION OF THE PREFERRED EMBODIMENTS

The invention provides systems and methods for synthesizing various organic compounds onto solid supports and for the subsequent cleavage of the synthesized compounds from the solid supports for future analysis. The solid supports upon which the compounds are to be synthesized will usually comprise beads. Such beads are usually constructed of a polymer such as polystyrene and polyethylene glycol and are generally spherical in geometry. Such beads are commercially available from, for example, Nova Bio-Chem.

The systems and methods of the invention include several important features which markedly improve the synthesizing and screening process. One important feature is that the reaction vessels are subjected to a unique type of chaotic vibration during synthesis. Moreover, the duration and intensity of the reaction vessel vibration may be precisely controlled for efficiently mixing the beads with the reagents.

Another important feature of the invention is the manner in which the reaction vessels are heated. The invention provides a plurality of reaction vessels, each of which may have its temperature separately controlled. With such a configuration, a single reaction may take place in several reaction vessels which are all at the same or different temperatures. Similarly, different reactions may take place in various reaction vessels which are at the same or different temperatures. The invention further provides a cooling system to remove heat from the reaction vessels when needed. The cooling system may also be employed to create a temperature gradient within a reaction vessel block containing the reaction vessels. In this way, each reaction vessel may be heated to a different temperature.

The invention also allows for the creation of both isothermic and anisothermic temperature profiles. In this manner, individual reaction vessels within a group will experience the same temperature, while multiple groups of the reaction vessels will experience different temperatures relative to each other. This may be accomplished, for example, by creating a two dimensional array of reaction vessels within a block and subjecting opposite sides of the block to different temperatures.

In addition to synthesizing, the invention provides for the cleavage of the compounds from their solid supports while remaining in their respective reaction vessels. In this way, both synthesis and cleavage may be carried out in a single device. Furthermore, the cleaved compounds may be collected into standard deep well plates, such as 48- or 96-well plates, so that analysis of the cleaved compounds may occur with standard processing equipment.

Figure 1:
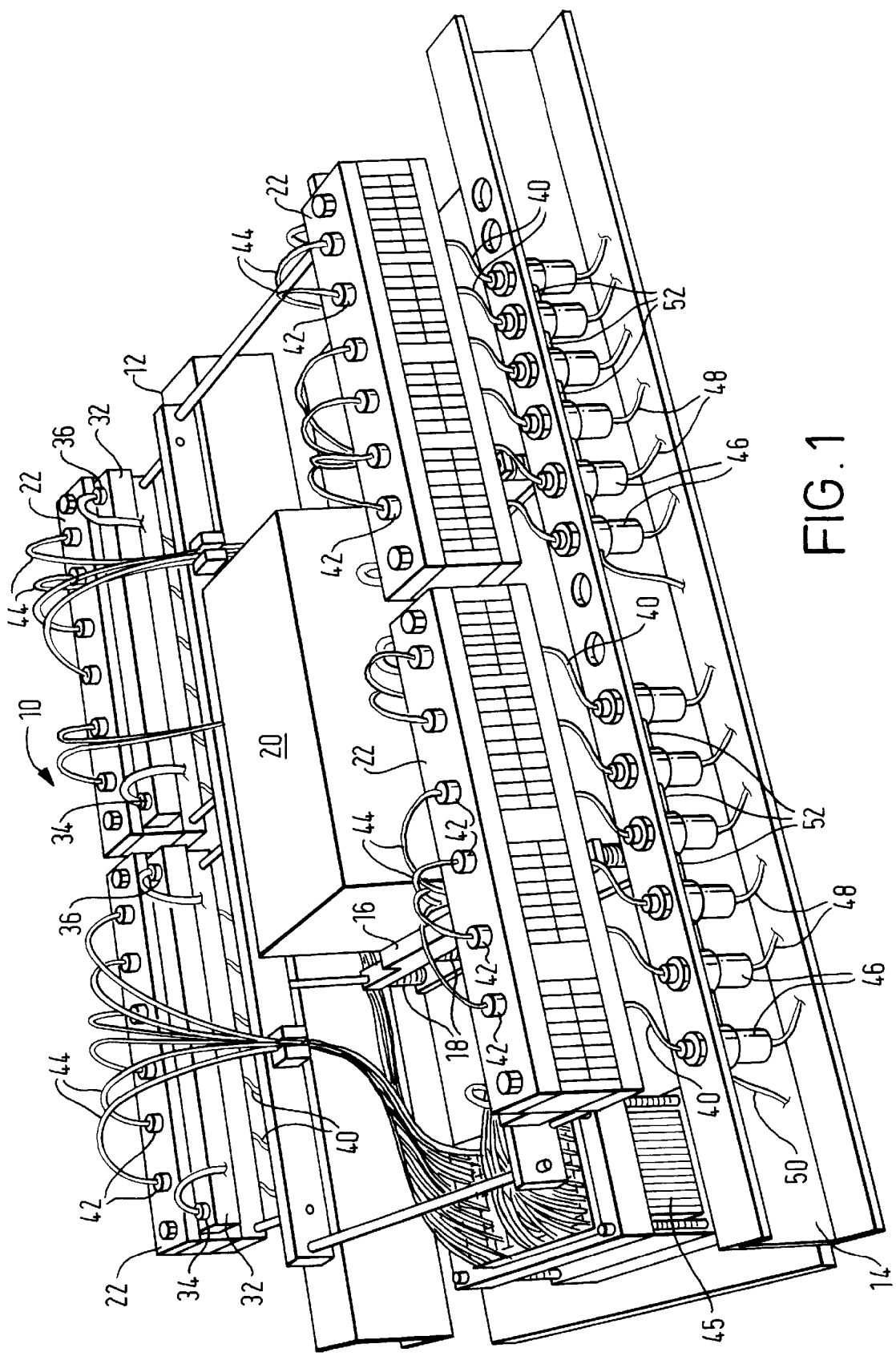
FIG. 1 is a perspective view of an exemplary chemical synthesizer according to the present invention.

Referring now to FIG. 1, and exemplary system 10 for synthesizing compounds on solid supports will be described. System 10 comprises a chemical synthesizer 12 having a base frame 14 and a vibrator frame 16. Vibrator frame 16 rests or "floats" upon a plurality of helical springs 18 which are positioned between vibrator frame 16 and base frame 14.

Attached to vibrator frame 16 is a vibrator 20 and four reaction vessel blocks 22 which are substantially identical to each other. As described in greater detail hereinafter with reference to FIGS. 2–4, each reaction vessel block includes a plurality of reaction vessels 30. Although shown with four reaction vessel blocks, it will be appreciated that synthesizer 12 may alternatively include various numbers of reaction vessel blocks depending upon the particular application.

Attached to each reaction vessel block 22 is a cooling plate 32. Each cooling plate 32 includes an inlet 34 and an outlet 36 through which a cooling fluid is circulated. Attached to a plurality of inlet connectors 38 (See FIG. 5) are a plurality of inlet tubes 40 for introducing fluids into the reaction vessels. Each reaction vessel block 22 further includes a plurality of outlet connectors 42 and outlet tubes 44 through which fluids exiting the reaction vessels will pass. The fluids passing through outlet tubes 44 are collected into a waste disposal plate 45 which rests on base frame 14. Both the tubing and connectors will preferably be constructed of polytetrafluoroethylene, sold under the tradename of Teflon.

Attached to base frame 14 are a plurality of valves 46 to which inlet tubes 40 are connected. Valves 46 serve to control introduction of fluids into the reaction vessels. A plurality of cables 48 are connected to valves 46 and are in turn connected to a controller (not shown) which controls actuation of valves 46. A reaction vessel inlet 50 is connected to one of the valves 46 of each reaction vessel block 22 and serves to introduce the various fluids to the reaction vessels. As shown, each of the valves 46 are interconnected with connecting tubes 52 so that various fluids supplied through reaction vessel inlet 50 may be delivered to each valve 46.

Figure 2:
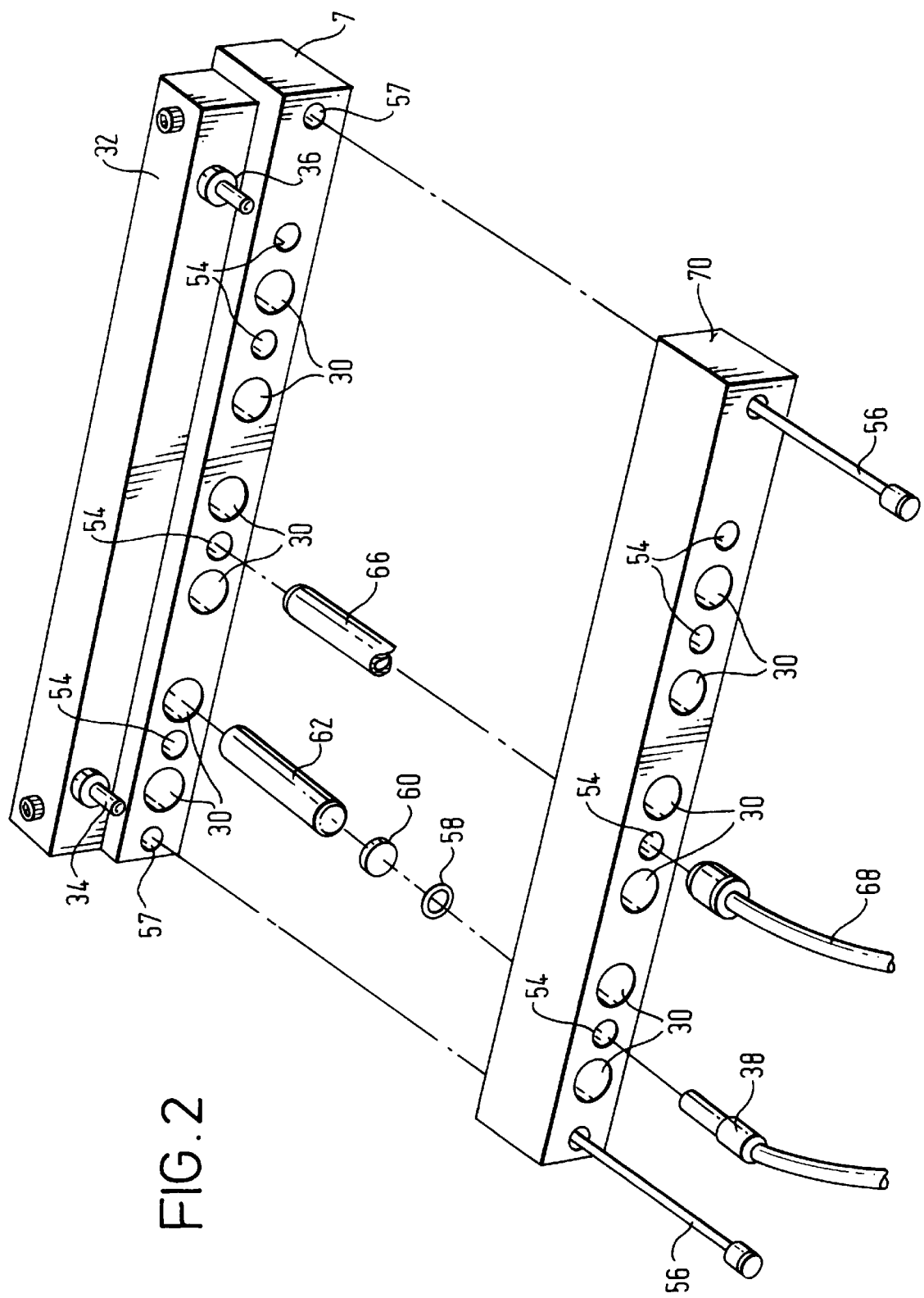
FIG. 2 is a perspective view of a middle section of a reaction vessel block of the synthesizer of FIG. 1 having a heat exchanger attached thereto.
Figure 3:
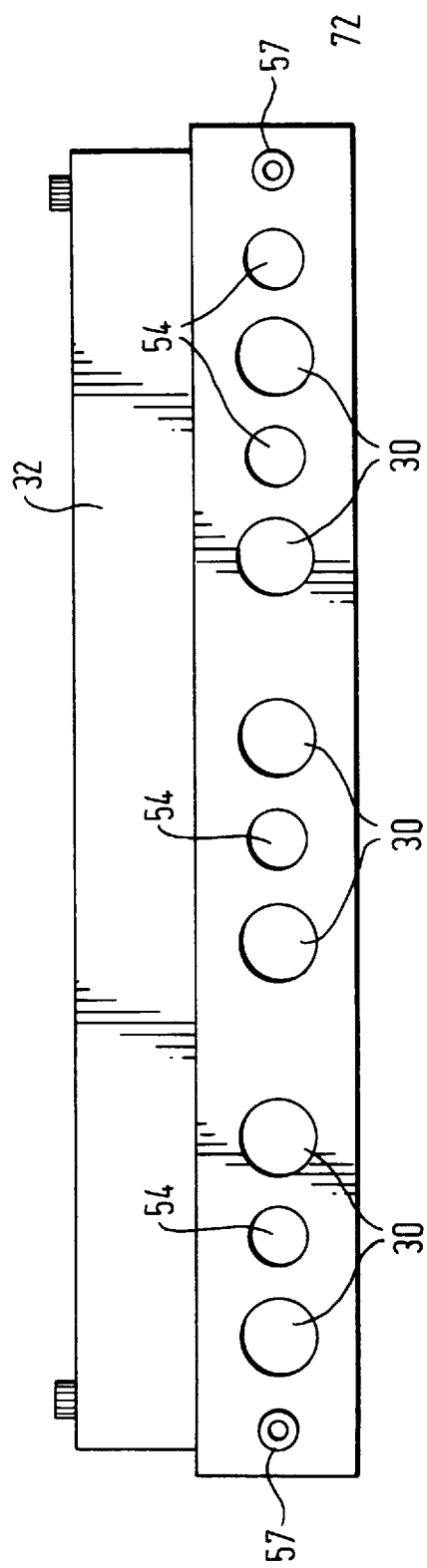
FIG. 3 is a top view of the middle section of the reaction vessel block of FIG. 2.

Referring now to FIGS. 2 and 3, construction of reaction vessel block 22 and cooling plate 32 will be described in greater detail. As described hereinafter with reference to FIGS. 4 and 5, each reaction vessel block comprises a lower support plate 70, an intermediate support plate 72, and an upper support plate 74. The intermediate support plate 72 is illustrated in FIGS. 2 and 3. A connecting bolt 56 is placed through an aperture 57 employed to secure the various plates together as shown in FIG. 2.

Included within intermediate support plates 72 are reaction vessels 30 and a plurality of heating element sockets 54. Held within each reaction vessel 30 is an o-ring 58, a teflon filter 60 and a reaction vessel liner 62. O-ring 58 is preferably constructed of FETFE and filter 60 and liner 62 are preferably constructed from Teflon. The various plates of each reaction vessel block 22 are preferably constructed of aluminum.

When assembled (See FIGS. 4 and 4A), reaction vessel liner 62 will fit within reaction vessel 30, with filters 60 resting upon each end of reaction vessel liner 62. Connectors 38 and 42 assist in holding filters 60 adjacent liner 62. Alternatively, filter 60 may be inserted into reaction vessel liner 62. O-ring 58 provides a seal between reaction vessel liner 62 and reaction vessel 30. With such a configuration, the solid supports may rest upon filter 60, with the space above filter 60 forming a reaction vessel space. Conveniently, the wall of reaction vessel 30 may include a lip to hold filter 60 against reaction vessel liner 62 when assembled.

Held within each heating element socket 54 is a heating element 66. A heating power cable 68 is connected to heating element 66 to provide the necessary current to heating element 66. As shown in FIG. 3, heating element sockets 54 are arranged so that different areas of intermediate support plate 72 have a higher density of heating elements 66. In this way, all of the heating elements within plate 72 may be operated at the same time to produce a temperature gradient within plate 72, thereby heating the reaction vessels 30 to different temperatures. Heating elements 66 may simultaneously be turned off and on to produce the desired gradient.

Alternatively, each power cable 68 may be connected to a central controller (not shown) so that the temperature of each heating element 66 may be separately controlled. In this manner, heating element 66 may be employed to heat each reaction vessel 30 to the same temperature or to different temperatures.

By constructing reaction vessel blocks 22 of aluminum, heat may be rapidly transferred from heating element 66 to reaction vessels 30. A thermocouple (not shown) will be preferably associated with each reaction vessel 30. The thermocouples may be employed to simply measure the temperature of each reaction vessel 30 or may be employed to monitor and control the actuation of each heating element 66.

The placement of heating elements 66 in the manner just described is advantageous in that the same reaction may take place in each reaction vessel 30 at the same or at different temperatures. In this way, an efficient system is provided to determine which temperatures are best suited for each reaction. Alternatively, different reactions may occur within each reaction vessel 30, either at the same or at different temperatures.

Attached to intermediate support plate 72 is cooling plate 32. Circulated through cooling plate 32 is a coolant, such as water, for removing heat from reaction vessel block 22. The coolant is circulated through inlet 34 and outlet 36 as previously described. Since reaction vessel block 22 is preferably constructed of aluminum, heat may rapidly be transferred from the reaction vessels 30 when needed. One advantage of cooling plate 32 is that the coolant may be allowed to increase in temperature as is flows through cooling plate 32 and collects heat from intermediate support plate 72. In this manner, the amount of heat removed from plate 72 will vary along its length, thus assisting in the creation of a temperature gradient within plate 72.

Figure 4:
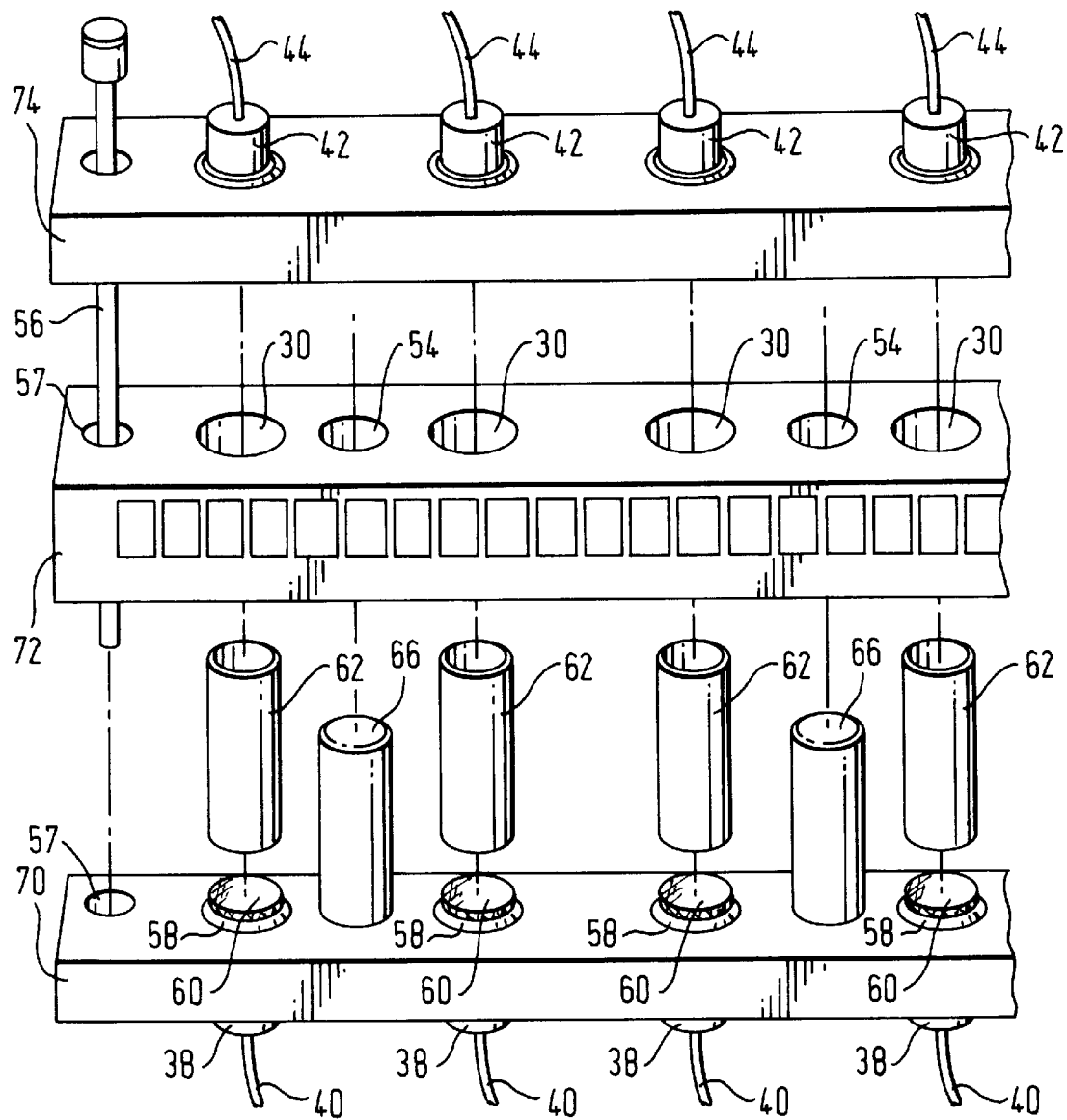
FIG. 4 is a disassembled view of a reaction vessel block of FIG. 1.
Figure 4A:
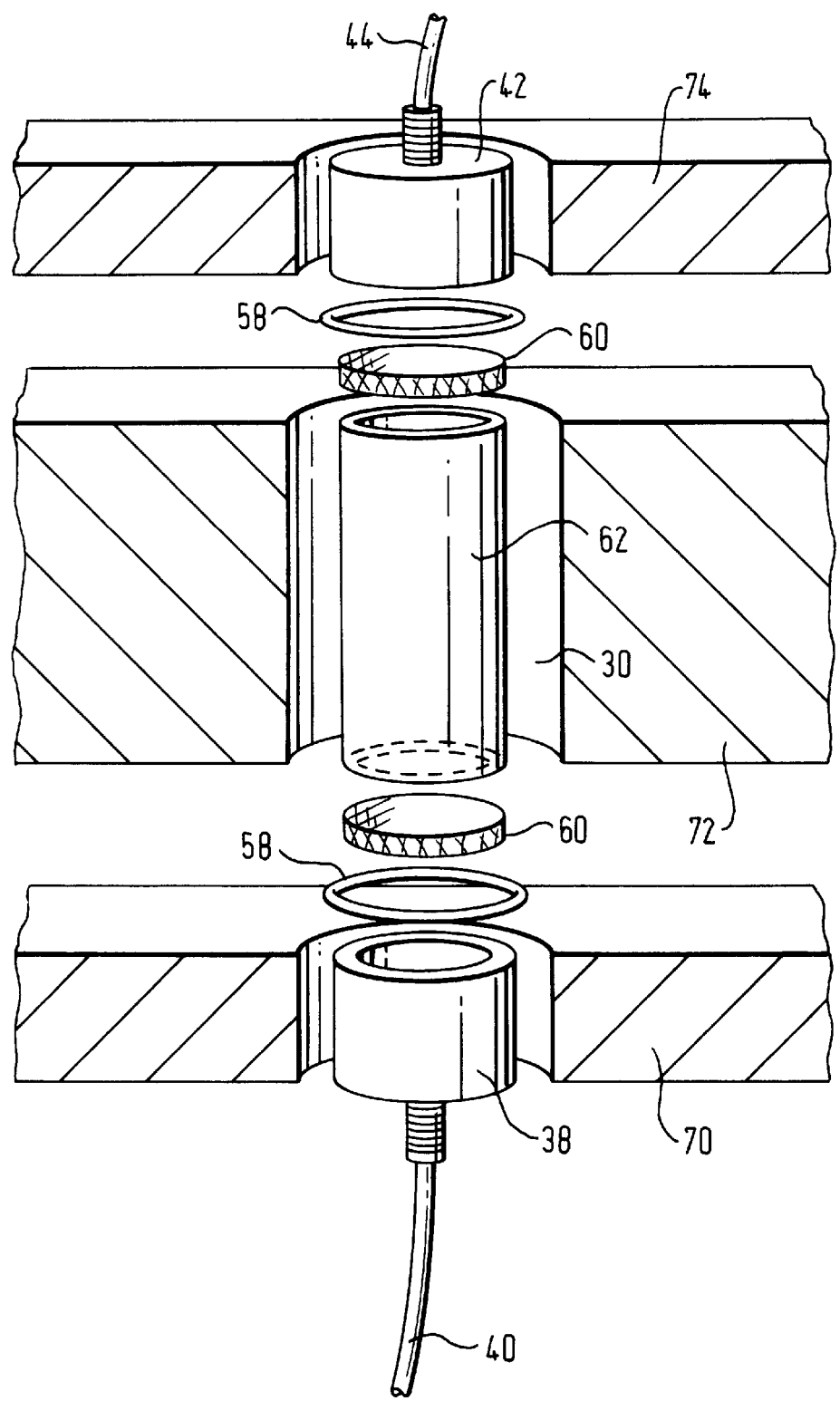
FIG. 4A is a cut-away side view of a reaction vessel within the block of FIG. 4.
Figure 4B:
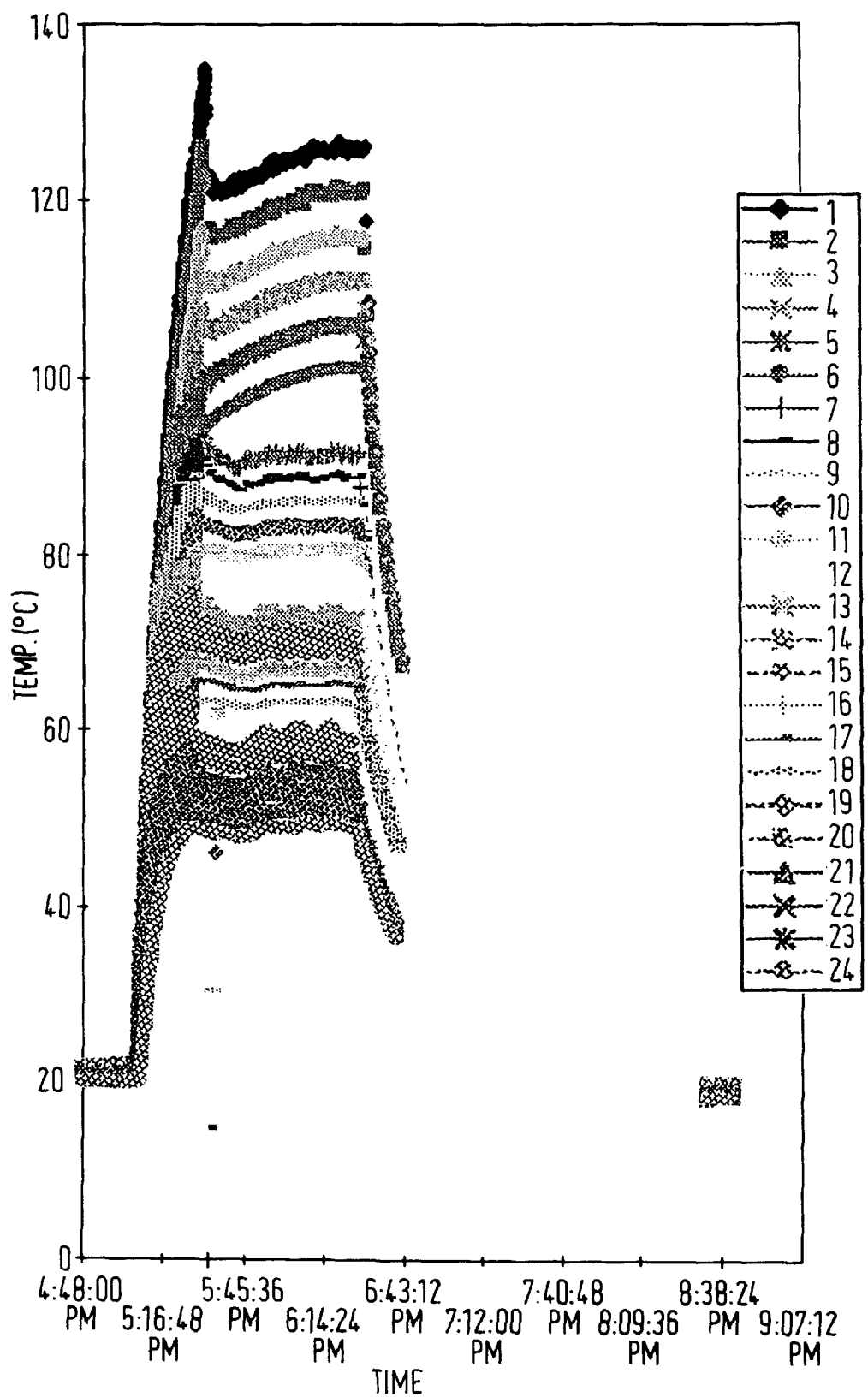
FIG. 4B is a graph showing a set of temperature profiles recorded within the reaction vessels of the synthesizer of FIG. 1.

FIG. 4B is a graph showing twenty-four actual temperature profiles that were recorded for reaction vessels 30 of synthesizer 10. Each temperature profile corresponds to one of the reaction vessels. The graph of FIG. 4B illustrates that synthesizer 10 may be employed to heat the reaction vessels to different temperatures relative to each other. Further, each individual reaction vessel may have its own temperature varied over time. Such temperature variations in turn provide flexibility to the synthesizer and allow a wide variety of reactions to take place at various temperatures.

Figure 5:
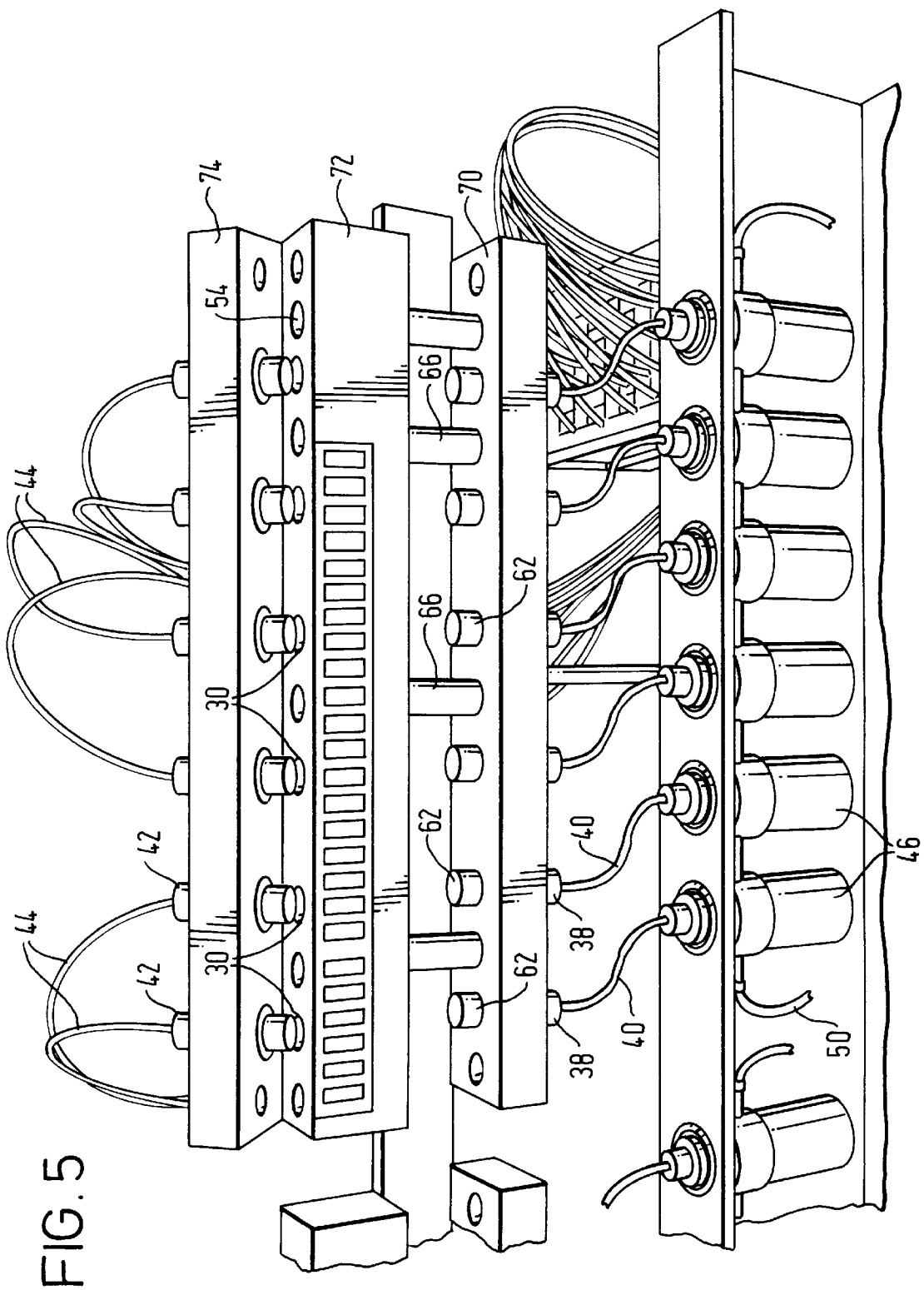
FIG. 5 illustrates the reaction vessel block of FIG. 4 when attached to the remainder of the synthesizer of FIG. 1.

Referring to FIGS. 4 and 5, other features of reaction vessel block 22 will be described. As previously mentioned, reaction vessel block 22 is constructed from three plates: lower support plate 70, intermediate support plate 72, and upper support plate 74. Reaction vessel liners 62 are fitted into reaction vessels 30 within intermediate support plate 72, which in turn is sandwiched between plates 70 and 74. The filters 60 are thus held between liners 62 and inlet connectors 38 and outlet connectors 42 as shown. In this way, the solid supports may rest on the bottom filter 60 and fluids introduced through the bottom of each reaction vessel 30 so that synthesis may take place in the reaction vessels 30. The top filter 60 prevents the solid supports from exiting the reaction vessels 30 through outlet tubes 44 when fluids are removed.

Figure 6:
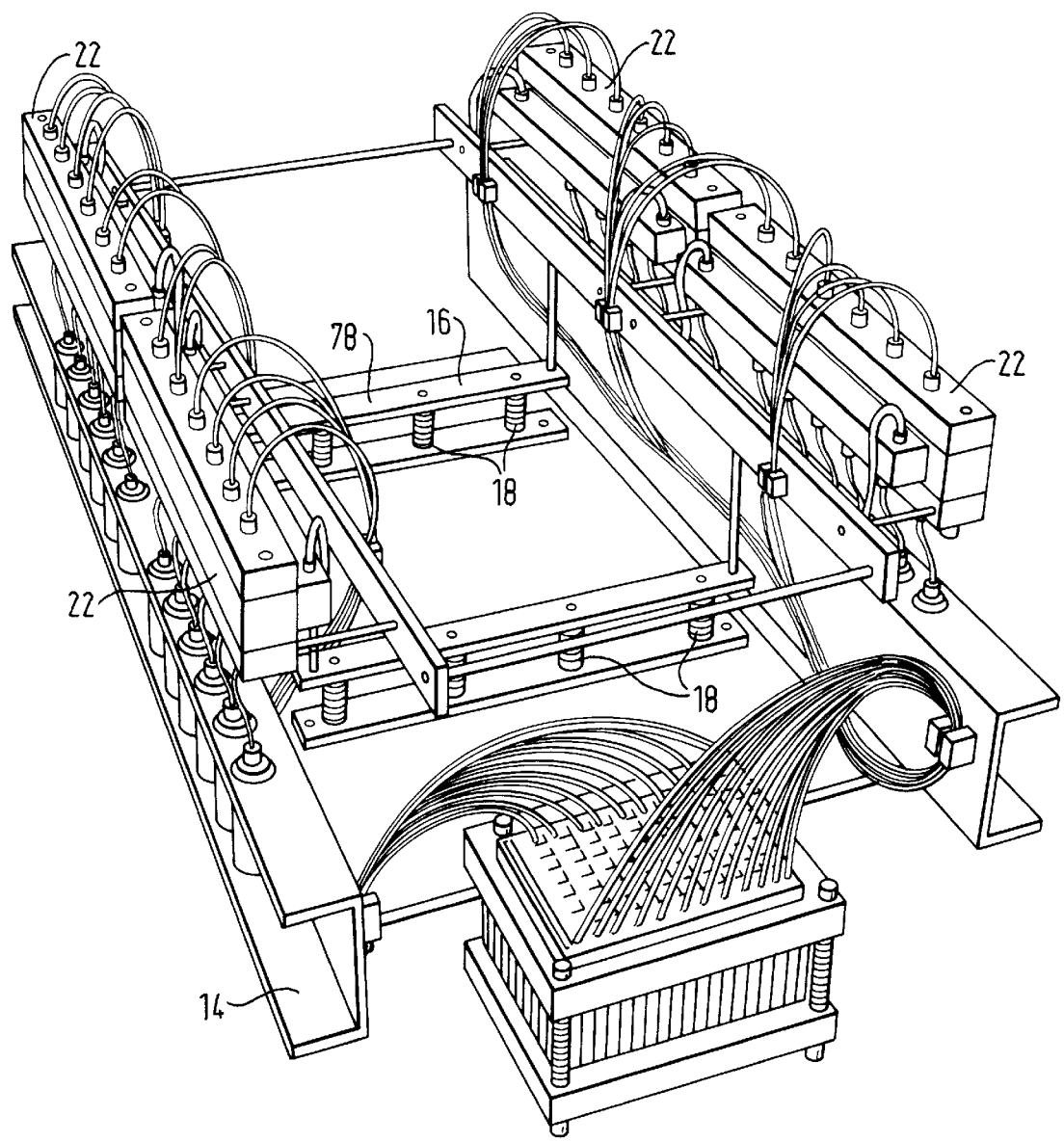
FIG. 6 is a perspective view of a front end of the synthesizer of FIG. 1 with the vibrator being removed.

Referring to FIG. 6, vibration of reaction vessel blocks 22 to accomplish mixing will be described in greater detail. As previously described, vibrator frame 16 rests upon a plurality of springs 18. Vibrator 20 (See FIG. 1) rests upon a pair of supports 78 so that, when actuated, vibrator frame 16 will vibrate independent of base frame 14 to uniquely vibrate the reaction vessels 30. More particularly, the reaction vessels 30 are subjected to a rigorous vibration in a chaotic manner, i.e. in a random and non-systematic manner. Such chaotic vibration has shown to be more effective in mixing the beads and reagent than a mere translational shaking or a patterned swirling of the reaction vessels. Although a variety of vibrators may be employed to vibrate reaction vessels 30, an exemplary vibrator comprises an electromagnetic vibrator operating at a frequency of about 3600 Hz.

Figure 7:
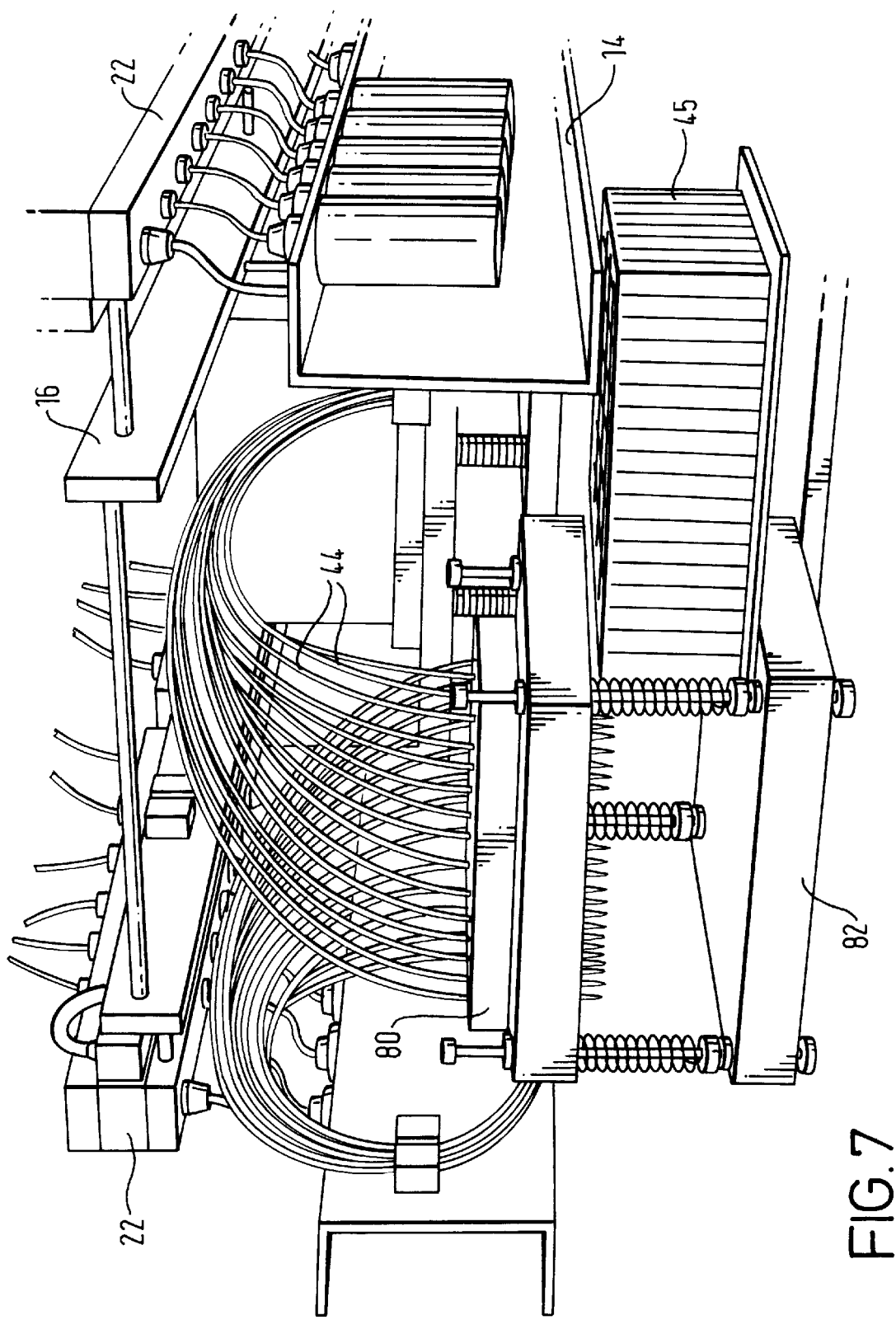
FIG. 7 is a more detailed view of the front end of the synthesizer of FIG. 1 showing a removable waste disposal plate.

As shown in FIG. 7, outlet tubes 44 are arranged to converge at an outlet tubing holder 80. Outlet tubing holder 80 arranges outlet tubes 44 so that they are aligned with wells of waste disposal plate 45. In this manner, fluids employed during synthesis may be disposed of in waste collection plate 45. Conveniently, a base plate 82 is provided for holding waste collection plate 45.

One particular advantage of employing outlet tubing holder 80, is that waste collection plate 45 may be substituted for a conventional deep well plate, such as a 48- or 96-well plate. The deep well plate may be employed to collect compounds which have been cleaved from the solid supports in reaction vessels 30 following synthesis. In this manner, the cleaved compounds may be conveniently screened employing commercially available equipment which are designed to handle conventional deep well plates. In this manner, a biologist or chemist may use system 10 to both synthesize compounds on beads and then remove the synthesized compounds for subsequent analysis using standard processing equipment.

Referring back to FIG. 1, an exemplary method for synthesizing various compounds on beads using system 10 will be described. The process of synthesis begins by placing a plurality of beads into each of the reaction vessels 30, with the beads resting on filters 60 (See FIG. 4). A reagent is then introduced into each of the reaction vessels 30 through reaction vessel inlet 50. Valves 46 are employed to control the volume of reagent entering each reaction vessel 30. Optionally, the flow through each reaction vessel 30 may be monitored in order to determine if an appropriate volume of reagent has been delivered.

Valves 46 are configured such that the same reagent or different types of reagents may be delivered to each reaction vessel. If the same reagent is to be delivered to each reaction vessel 30, the valves 46 are configured so that the reagent will flow through connecting tubes 52 to deliver the reagent to each reaction vessel 30. Alternatively, appropriate valves may be opened or closed while introducing different reagents through reaction vessel inlet 50 to supply different reagents to each of the reaction vessels 30.

When each reaction vessel 30 is filled with an appropriate volume of reagent, vibrator 20 is actuated to mix the beads and reagent. The frequency and duration of vibration may be carefully controlled with vibrator 20 and may vary depending upon the particular application.

During vibration, heating element 66 (FIG. 4) will be employed to heat each of the reaction vessels 30 to a desired temperature. Each reaction vessel may be heated to the same or a different temperature as previously described.

Following synthesis, the reagents are displaced from reaction vessels 30 by introducing an inert gas, such as argon, through reaction vessel inlet 50 where it passes into each of inlet tubes 40 to expel the reagents into outlet tubes 44. In turn, the used reagents are transported into waste disposal plate 45. As previously described, top filter 60 maintains the beads within reaction vessels 30 during removal of the reagents.

A washing solution may also be introduced into each of the reaction vessels 30 in a manner similar to that previously described in connection with the introduction of the reagents. Following washing, a cleaving solution, such as triflouric acid, may be introduced into each of the reaction vessels to remove the synthesized compounds from the beads. Following cleavage, the cleaving solution having the compounds is removed from each reaction vessel by an inert gas and is distributed into a standard multiplate well that is compatible with automated processing and analysis equipment, such as an HPLC or mass spectrometer. In this manner, a chemist or biologist may simply remove the multiplate well from the synthesizer following cleavage so that the multiwell plate can be transferred to commercially available processing equipment. Optionally, the reaction vessel blocks 22 may be vibrated with vibrator 20 during cleavage.

EXAMPLES

By way of illustration, the system described in FIG. 1 has been successfully employed to produce a variety of chemistries. For example, the following chemistries have been successfully carried out using system 10 as described above: peptide syntheses, 2+4 cycloadditions (synthesis of epoxyisoindoles), 2+3 cycloadditions (synthesis of pyrrolidines), Ugi four component condensations, synthesis of thiazolidines, reductive alkylations, alkylations and acylations.

Although the foregoing invention has been described in some detail by way of illustration and example, for purposes of clarity of understanding, it will be obvious that certain changes and modifications may be practiced within the scope of the appended claims. For example, the various fluids may be manually introduced into each of the reaction vessels rather than relying upon a controller as previously described.

What is claimed is:

1. A system for synthesizing compounds, the system comprising:

at least one reaction vessel block having a plurality of reaction vessels therein, each of said reaction vessels including a bottom end, a top end, and a valve positioned near each bottom end;

a vibrator which vibrates the reaction vessel block;

at least one heater associated with the reaction vessel block to supply heat to the reaction vessels, said heater comprising at least one heating element disposed within the reaction vessel block which is positioned to develop a temperature gradient within the block such that each reaction vessel may be heated to a different temperature;

at least one reagent source in fluid communication with at least one of the reaction vessels; and a base and at least one spring which is positioned between the base and the reaction vessel block;

wherein each valve controls the amount of reagent that is delivered to its corresponding reaction vessel through the bottom end, and wherein the reaction vessel block rests on the spring above the base and the reaction vessel block may be vibrated independent of the base.

2. A system as in claim 1, wherein the reaction vessel block is constructed of aluminum.

3. A system as in claim 1, wherein the reaction vessel block includes a plurality of apertures, wherein the reaction vessels are positioned within the apertures, and wherein the reaction vessels are constructed of polytetrafluoroethylene.

4. A system as in claim 1, further comprising at least one thermocouple disposed within the reaction vessel.

5. A system as in claim 1, further comprising a collection plate having a plurality of wells, and further comprising lengths of tubing operably connected to each reaction vessel, wherein fluids from the reaction vessels may be delivered to the wells of the collection plate.

6. A system as in claim 5, wherein the collection plate includes ninety-six wells.

7. A system as in claim 1, further comprising a source of inert gas in communication with each reaction vessel.

8. A system as in claim 1, further comprising a source of washing solution in communication with each reaction vessel.

9. A system as in claim 1, further comprising a frit that is positioned within each reaction vessel.

10. A system as in claim 1, further comprising a plurality of reaction vessel blocks.

11. A system for synthesizing compounds, the system comprising:

at least one reaction vessel block having a plurality of reaction vessels therein;

a vibrator which vibrates the reaction vessel block;

at least one heater associated with the reaction vessel block to supply heat to the reaction vessels, said heater comprising at least one heating element disposed within the reaction vessel block, said element being positioned to develop a temperature gradient within the block such that each reaction vessel may be heated to a different temperature; and a base and at least one spring which is positioned between the base and the reaction vessel block, wherein the reaction vessel block rests on the spring above the base and the reaction vessel block may be vibrated independent of the base.

12. A system as in claim 11, further comprising a collection plate having a plurality of wells, and further comprising lengths of tubing operably connected to each reaction vessel, wherein fluids from the reaction vessels may be delivered to the wells of the collection plate.

13. A system as in claim 11, further comprising a frit that is positioned within each reaction vessel.

* * * * *